United States Patent
Ficht (10) Patent No.: US 9,488,274 B2
(45) Date of Patent: Nov. 8, 2016

(54) CYLINDER OF A RECIPROCATING PISTON MACHINE AND RECIPROCATING PISTON MACHINE

(75) Inventor: Reinhold Ficht, Kirchseeon (DE)

(73) Assignee: Bertwin R. Geist, Eurasburg (DE)

( * ) Notice: Subject to any disclaimer, the term of this patent is extended or adjusted under 35 U.S.C. 154(b) by 491 days.

(21) Appl. No.: 13/993,069

(22) PCT Filed: Nov. 14, 2011

(86) PCT No.: PCT/EP2011/070037
§ 371 (c)(1),
(2), (4) Date: Aug. 22, 2013

(87) PCT Pub. No.: WO2012/076292
PCT Pub. Date: Jun. 14, 2012

(65) Prior Publication Data
US 2013/0327212 A1    Dec. 12, 2013

(30) Foreign Application Priority Data
Dec. 10, 2010 (DE) .................. 10 2010 054 060

(51) Int. Cl.
| | | |
|---|---|---|
| F04B 53/16 | (2006.01) | |
| F16J 1/00 | (2006.01) | |
| F02F 1/00 | (2006.01) | |
| F02F 7/00 | (2006.01) | |
| F16J 10/04 | (2006.01) | |

(52) U.S. Cl.
CPC ............... *F16J 1/00* (2013.01); *F02F 1/004* (2013.01); *F02F 7/0087* (2013.01); *F04B 53/166* (2013.01); *F16J 10/04* (2013.01); *F04B 53/168* (2013.01)

(58) Field of Classification Search
CPC ..................................... F04B 53/168
See application file for complete search history.

(56) References Cited

U.S. PATENT DOCUMENTS

| | | |
|---|---|---|
| 4,562,799 A | 1/1986 | Woods et al. |
| 4,999,912 A | 3/1991 | Cuccato et al. |
| 5,063,881 A | 11/1991 | Kawamura |
| 5,111,869 A | 5/1992 | Corbett et al. |
| 5,638,779 A * | 6/1997 | Atmur ............... F02B 41/00 123/193.2 |
| 7,568,273 B2 * | 8/2009 | Iizumi ............ B23B 27/007 29/458 |

FOREIGN PATENT DOCUMENTS

| | | |
|---|---|---|
| DE | 2140378 A | 2/1973 |
| DE | 3200549 A1 | 10/1982 |
| DE | 4022705 A1 | 1/1991 |
| DE | 3931678 C2 | 4/1991 |
| DE | 4301126 A1 | 7/1994 |
| DE | 19837099 C1 | 10/1999 |

(Continued)

OTHER PUBLICATIONS

"International Search Report for PCT Application No. PCT/EP2011/070037", English translation, Mailed Date: May 2, 2012, Filed Date: Nov. 14, 2011, 3 Pages.

*Primary Examiner* — F. Daniel Lopez (57) ABSTRACT

The invention relates to a cylinder made of metallic material or of plastic for a reciprocating piston machine having a crank drive, in particular having a crank loop drive, having at least one cylinder casing that has a cylinder bore, and also at least one cylinder sleeve made of ceramic material mounted in the cylinder bore, wherein the cylinder sleeve is adhesively bonded into the cylinder bore.

8 Claims, 8 Drawing Sheets

(56) References Cited

FOREIGN PATENT DOCUMENTS

| | | |
|---|---|---|
| DE | 10324279 A1 | 12/2004 |
| DE | 102004005458 A1 | 9/2005 |
| DE | 102007060502 A1 | 5/2009 |
| EP | 0230866 B1 | 3/1990 |
| EP | 1087124 A2 | 8/2000 |
| GB | 2204658 A | 11/1988 |
| JP | 57123932 U | 8/1982 |
| JP | 61145851 U | 7/1986 |
| JP | 62135845 U | 6/1987 |
| JP | 07139419 A | 5/1995 |
| WO | 2005037463 A3 | 4/2005 |

* cited by examiner

CYLINDER OF A RECIPROCATING PISTON MACHINE AND RECIPROCATING PISTON MACHINE

FIELD OF THE INVENTION

The present invention relates to a cylinder of a reciprocating piston machine, in particular of a reciprocating piston engine or a reciprocating piston compressor, having a crank mechanism, preferably a Scotch yoke mechanism, and having at least one cylinder bushing situated in a cylinder bore of the cylinder, and relates to a reciprocating piston machine equipped with such a cylinder.

BACKGROUND OF THE INVENTION

As a rule, cylinders of reciprocating piston machines are composed of cast iron, in particular gray cast iron, or to reduce weight, of light metal alloys such as aluminum alloys. The cylinders are manufactured by means of casting, particularly using sand casting or die casting. Since the inner surfaces of the cylinder bores provided in the cylinders, due to the material of which they are composed, are often insufficient to satisfy the tribological requirements placed on cylinder casings, it is customary to provide cylinder bushings in the cylinder bores.

According to DE 103 24 279 A1, the cylinder bushings are composed for example of an aluminum material, gray cast iron, or a ceramic material and are cast into a crankcase. In particular, the cylinder bushings according to DE 103 24 279 A1 can also be press-fitted into the gray cast iron housing instead of being cast into it.

WO 2005/037463 A3 discloses a method for bonding a cylinder bushing composed of cast iron, steel, aluminum, or an aluminum alloy into a cylinder block, with the outside of the cylinder bushing being provided with an aluminum alloy-based surface coating with a surface roughness of at least 200 nm. Then, the cylinder bushing is placed in a casting mold and molten aluminum is poured around it.

DE 32 00 549 A1 discloses an internal combustion engine with a cylinder block and cylinder bushings situated therein, which can be composed of sintered silicon carbide.

The object of the present invention is to provide a cylinder of a reciprocating piston machine, in particular of a reciprocating piston engine or a reciprocating piston compressor, having a crank mechanism, preferably a Scotch yoke mechanism, and having at least one cylinder bushing situated in a cylinder bore, in which a permanent, axially and rotationally secured support of the cylinder bushing in the cylinder is insured even during operation of the reciprocating piston machine. Another object of the invention is to provide a reciprocating piston machine, in particular a reciprocating piston engine, having a crank mechanism, preferably a Scotch yoke mechanism, and having at least one such a cylinder.

SUMMARY OF THE INVENTION

In certain embodiments, the invention is directed to a cylinder composed of a metallic material or plastic for a reciprocating piston machine, having a crank mechanism, in particular a Scotch yoke mechanism, having at least one cylinder casing that has a cylinder bore, and having at least one cylinder bushing composed of ceramic material supported in the cylinder bore, characterized in that the cylinder bushing is glued into the cylinder bore. Furthermore, the cylinder casing may have a cylinder casing wall and the cylinder bore may have a bore surface, with at least one glue-filled glue pocket provided in the cylinder casing wall, embodied in the form of a recess in the bore surface, and the cylinder bushing may be glued to the cylinder casing with the glue. The cylinder may include a plurality of glue pockets. The recess may be a channel or a groove. A channel may extend in both the axial direction relative to a central cylinder axis and in the circumference direction of the cylinder casing wall. A plurality of recesses may be provided, which are distributed over the entire cylinder casing wall. The cylinder bore may have a right-hand internal thread and a left-hand internal thread and in particular, the threads may each extend over the entire cylinder bore, viewed in the axial direction. The two threads may each have one or more thread turns and the thread turns of the two threads may crisscross each other and intersect. The crisscrossing thread turns may divide the bore surface into individual mating surfaces against which the outer bushing surface of the cylinder bushing rests.

In certain embodiments, the invention is directed to a cylinder composed of metallic material or plastic for a reciprocating piston machine functioning in accordance with the 2-stroke principle, having a crank mechanism, in particular a Scotch yoke mechanism, having at least one cylinder casing that has a cylinder bore, and having at least one cylinder bushing composed of ceramic material supported in the cylinder bore, which has a bushing axis and a bushing end surface oriented toward the cylinder head; the cylinder casing has at least two gas passages, in particular at least one cylinder inlet opening and one cylinder outlet opening, and the cylinder bushing has at least two gas openings, in particular at least one bushing inlet opening and one bushing outlet opening; and a press fit is provided between a bore surface of the cylinder bore and an outer bushing surface of the cylinder bushing, characterized in that a non-press-fitted outer bushing surface region extends, viewed in the axial direction from the bushing end surface oriented toward the cylinder head, from the first gas opening of the cylinder bushing to the last gas opening of the cylinder bushing. The press fit may be provided only in an outer bushing surface fitting region, which, viewed in the axial direction from the bushing end surface oriented toward the cylinder head, extends between the end surface oriented toward the cylinder head and the first gas opening of the cylinder bushing. In the non-press-fitted outer bushing surface region, the outer bushing surface may be spaced apart from the bore surface. In the non-press-fitted outer bushing surface region, an annular gap may be provided between the outer bushing surface and the bore surface.

As described herein, in a cylinder composed of a metallic material or plastic for a reciprocating piston machine, having a crank mechanism, in particular a Scotch yoke mechanism, having at least one cylinder casing that has a cylinder bore, and having at least one cylinder bushing composed of ceramic material supported in the cylinder bore that has a bushing axis and a bushing end surface oriented toward the cylinder head and axially opposite from this, a bushing end surface oriented toward the crank mechanism, in which the cylinder bore has a bore surface, the cylinder casing may have an annular support shoulder, which protrudes radially inward from the bore surface and against which the bushing end surface of the cylinder bushing oriented toward the crank mechanism is supported. The support shoulder may be formed onto the bore surface.

In certain embodiments, the invention is directed to a cylinder composed of a metallic material or plastic for a reciprocating piston machine, having a crank mechanism, in particular a Scotch yoke mechanism, having at least one cylinder casing that has a cylinder bore, and having at least one cylinder bushing composed of ceramic material supported in the cylinder bore, characterized in that the cylinder bushing is supported in a support bushing that is composed of a ceramic material whose thermal conductivity is lower than the thermal conductivity of the material of the cylinder bushing and the support bushing is cast into the cylinder.

The invention further includes a reciprocating piston machine, in particular a reciprocating piston engine, having a crank mechanism, preferably a Scotch yoke mechanism, with any of the cylinders described herein. In the reciprocating piston machine, the cylinder bushing may be clamped in the axial direction between the support shoulder and the cylinder head, which is screw-mounted to the cylinder with the interposition of a cylinder head gasket.

The invention will be explained in detail below by way of example in conjunction with the drawings.

DETAILED DESCRIPTION OF THE PREFERRED EMBODIMENTS

The cylinder according to the invention has a cylinder casing 1 (FIGS. 1-7) with a cylinder bore 2 and a cylinder bushing or cylinder liner 3 situated and supported therein (FIGS. 3, 5-7). Inside the cylinder bushing 3, a respective piston 33 (FIG. 8) is supported in a reciprocating, intrinsically known fashion. A cylinder head (not shown) is situated at a first cylinder head end 1a of the cylinder. The cylinder head is connected to the cylinder with the interposition of a cylinder head gasket in an intrinsically known fashion, in particular is screw-mounted to it. A crank mechanism, preferably a Scotch yoke mechanism 32, is situated at a second crank mechanism end 1b of the cylinder. A part of the Scotch yoke mechanism 32 (or crankshaft), with a central Scotch yoke 34 and two pistons 33, each of which is connected to the Scotch yoke 34 by means of a piston rod 35, is schematically depicted in FIG. 8. At its second end 1b, the cylinder is connected to a housing part, which accommodates the Scotch yoke (not shown).

The hollow cylindrical cylinder casing 1 has a cylinder casing wall 4 and a cylinder axis 5. The cylinder casing wall 4 has a cylindrical inner casing surface 4a and a cylindrical outer casing surface 4b. The cylinder casing 1 in FIGS. 1-3 and 5-7 is only shown in a very schematic, idealized form and does not correspond to reality. In particular, the outer casing surface 4b does not have to be cylindrical, but can instead be differently shaped depending on the requirements and can, for example, be part of the piston machine. For example, one or more cavities can be provided in an intrinsically known fashion on the outside around the cylinder casing wall 4 in order to form a water jacket for cooling the cylinder casing; the cylinder casing 1 is connected to the rest of the cylinder by means of struts. The cylinder casing 1 is suitably provided with a cylinder end surface 23 at the cylinder head end, oriented toward the cylinder head. The cylinder end surface 23 is preferably embodied as flat and extends perpendicular to the cylinder axis 5. The cylinder end surface 23 serves as a flange surface for screw-mounting to the cylinder head. However, the cylinder end surface 23 can also be embodied, for example, as inclined and/or profiled and/or can have a channel in which a sealing ring (O-ring) is situated. Furthermore, the cylinder according to the invention can be embodied in the form of a single cylinder, with a reciprocating piston machine being advantageously provided with several single cylinders. Alternatively, a plurality of cylinders according to the invention can be situated in a shared cylinder block.

The cylinder bore 2 has a circular cylindrical bore surface 6, which is in particular composed of the inner casing surface 4a of the cylinder casing wall 4 and a central bore axis 7, which is in particular coaxial to the cylinder axis 5. In particular, the cylinder bore 2 is as a rule produced during the casting of the cylinder and the bore surface 6 is correspondingly machined after the casting. In addition, the cylinder bore 2 has a first bore end 2a at the cylinder head end, oriented toward the cylinder head and has a second bore end 2b at the crank mechanism end, oriented away from the cylinder head and toward the crankshaft.

The cylinder casing wall 4 in the vicinity of the cylinder bore 2 is provided in an intrinsically known fashion with at least one cylinder inlet opening 37 (FIG. 1), one or more overflow openings 8, and one or more cylinder outlet openings 9 extending through it, which are each flow-connected to a respective inlet, outlet, or overflow conduit (not shown) and function as gas passages or gas through openings (e.g. for fresh air and/or combustion gas) for the circulation process of the reciprocating piston machine, which functions in accordance with the two-stroke principle. The number, location, and geometry of the gas through openings 8; 9; 37 of the cylinder can vary in accordance with the respective requirements.

The cylinder, in particular the cylinder casing wall 4, is composed, according to the invention, of a metallic material or metal—in particular gray cast iron, of a light metal alloy—in particular an aluminum alloy, or of plastic.

The cylinder bushing 3 is likewise embodied as hollow and cylindrical and has a bushing wall 10 with a circular cylindrical outer bushing surface 11 and a circular cylindrical inner bushing surface 12. According to the invention, the cylinder bushing 3 is also composed of ceramic material, in particular SiC (silicon carbide) or of $Si_3N_4$ (silicon nitride). In particular, the cylinder bushing 3 is composed of Si-metal-infiltrated SiC (Si SiC) or SiSiC—C (carbon-containing silicon carbide) or a composite composed of SiC and graphite, preferably of SiC30, or a composite composed of $Si_3N_4$ and graphite. The advantage of graphite-containing materials is that graphite functions as a lubricant. As a result, in the context of the invention, it is preferable to use ceramic composites for the cylinder bushing 3, which contain a solid, in particular mineral, lubricant, in particular are infiltrated with it; lubricants other than graphite are also used, for example molybdenum sulfide $MoS_2$.

The bushing surface 12 serves in an intrinsically known way to guide the piston 33 in a sliding fashion. The cylinder bushing 3 also has a bushing axis 13, which is in particular coaxial to the bore axis 7. The cylinder bushing 3 also has a first bushing end surface 16 at the cylinder head end, oriented toward the cylinder head and a second bushing end surface 17 at the crank mechanism end, oriented away from the cylinder head and toward the crank mechanism. The two bushing end surfaces 16; 17 are preferably each embodied as planar and each extend perpendicular to the bushing axis 13. In addition, the two bushing end surfaces 16; 17 are situated at opposite ends in the axial direction with reference to the bushing axis 13.

Furthermore, the bushing wall 10 is respectively provided with one or more bushing inlet openings (not shown) extending through it, one or more bushing overflow openings 14 extending through it, and one or more bushing outlet openings 15 extending through it, which respectively function as gas passages. The number, location, and geometry of the gas passages 14; 15 of the cylinder bushing 3 here are matched to the number, location, and geometry of the gas passages 8; 9 of the cylinder. In particular, the cylinder bushing 3 is situated in the cylinder bore 2 in such a way that in the radial direction with reference to the cylinder axis 5, the bushing inlet openings coincide with the cylinder inlet openings 37, the bushing outlet openings 15 coincide with the cylinder outlet openings 9, and the bushing overflow openings 14 coincide with the cylinder overflow openings 8 (FIGS. 3, 5-7). The gas passages 14; 15 of the cylinder bushing 3 are also preferably embodied not in the form of slots extending into the bushing wall 10 from the second bushing end surface 17, but rather in the form of cutouts, which are entirely enclosed by the bushing wall 10. This yields a continuous, closed, annular bushing collar at the second bushing end surface 17, which among other things, fixes the exact position of the cylinder bushing 3 in the cylinder casing 1. In particular, external forces acting on the cylinder bushing 3 in the radial direction in the region of the second bushing end surface 17 and in the region around the bushing openings 14; 15 can be better absorbed without resulting in excessive stresses and breakage of the relatively brittle ceramic material. It is, however, possible to embody the bushing inlet opening in the form of a slot extending into the bushing wall 10 from the second bushing end surface 17 and to embody the bushing outlet opening and the bushing overflow openings as cutouts or perforations that are completely enclosed by the bushing wall 10.

Figure 1:
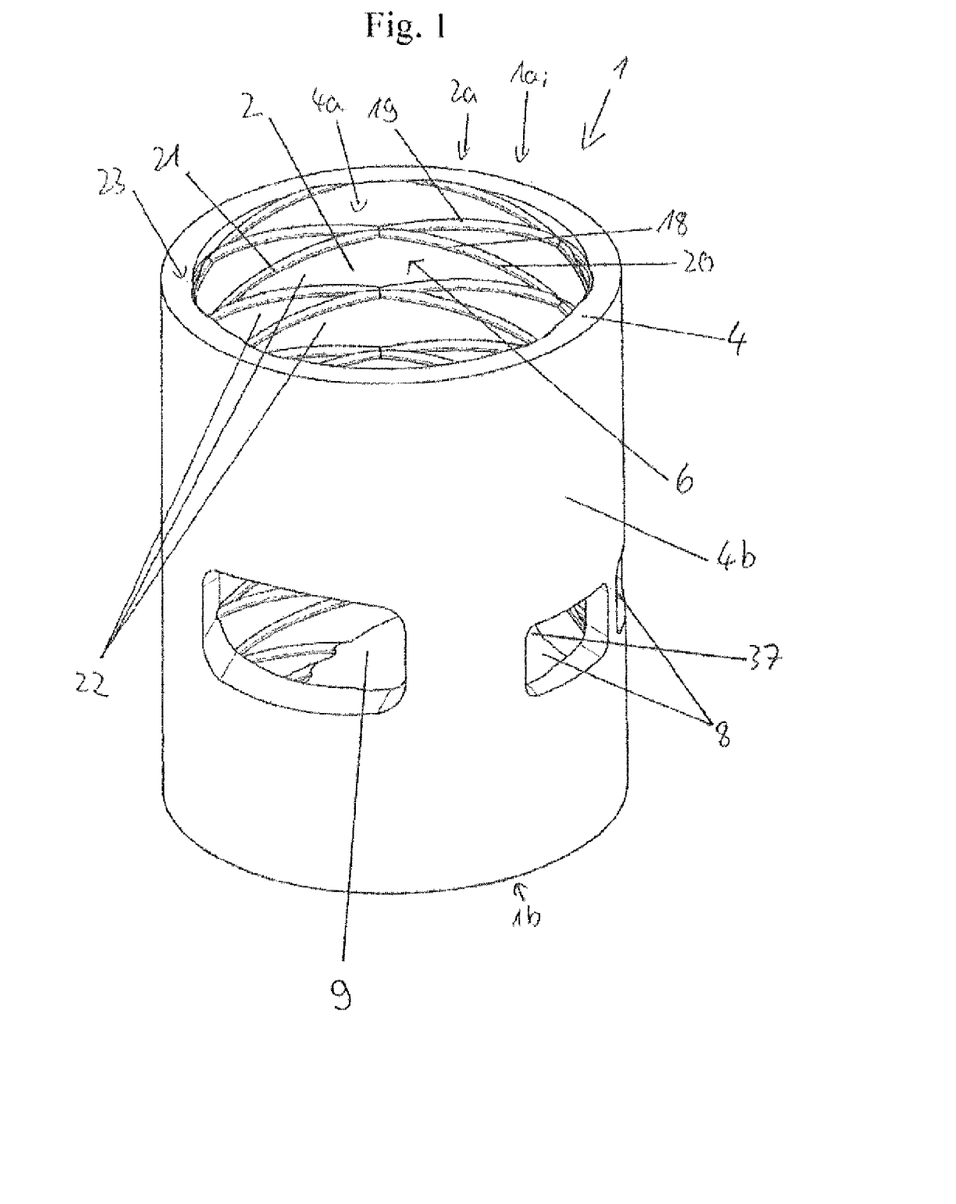
FIG. 1: is a very schematic perspective view of a cylinder casing of a cylinder according to a first exemplary embodiment of the invention.
Figure 2:
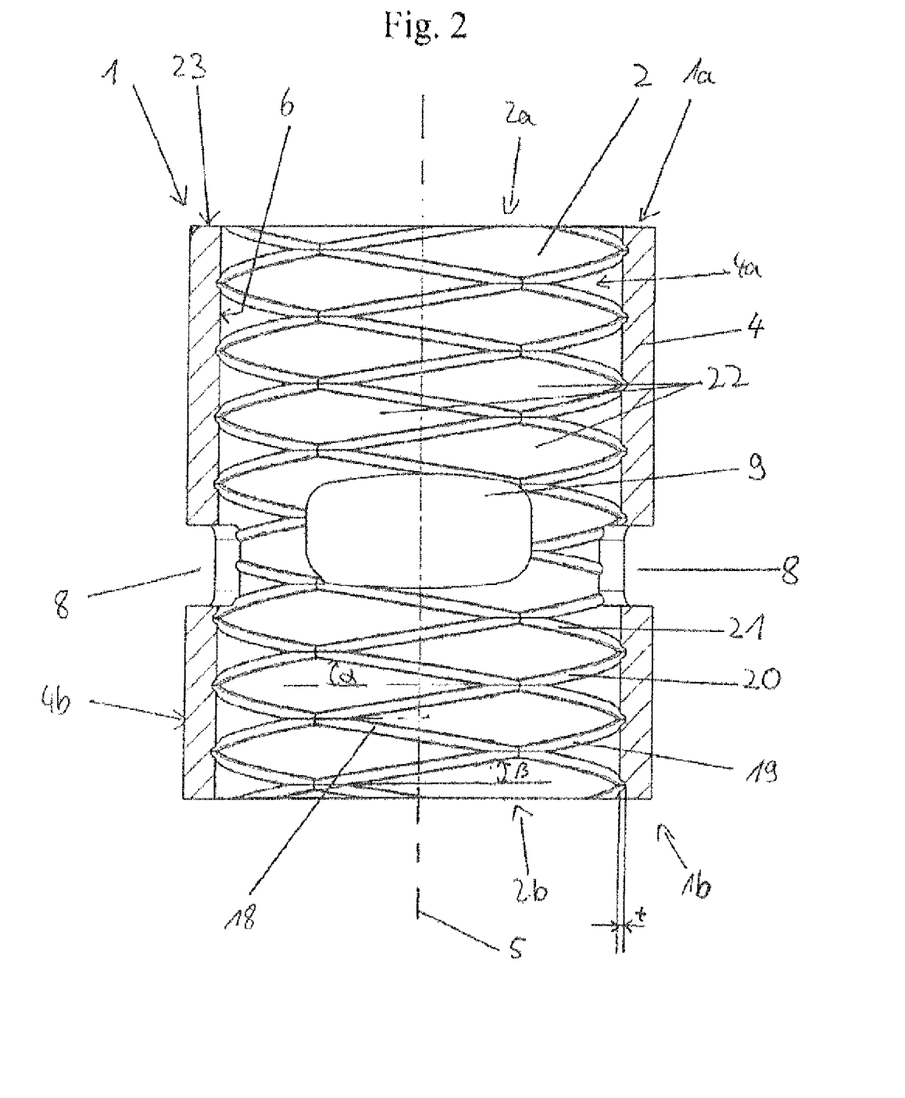
FIG. 2: is a longitudinal section through the cylinder casing according to FIG. 1, FIG. 3: is a longitudinal section through the cylinder casing according to FIG. 1, with a cylinder bushing situated therein.
Figure 3:
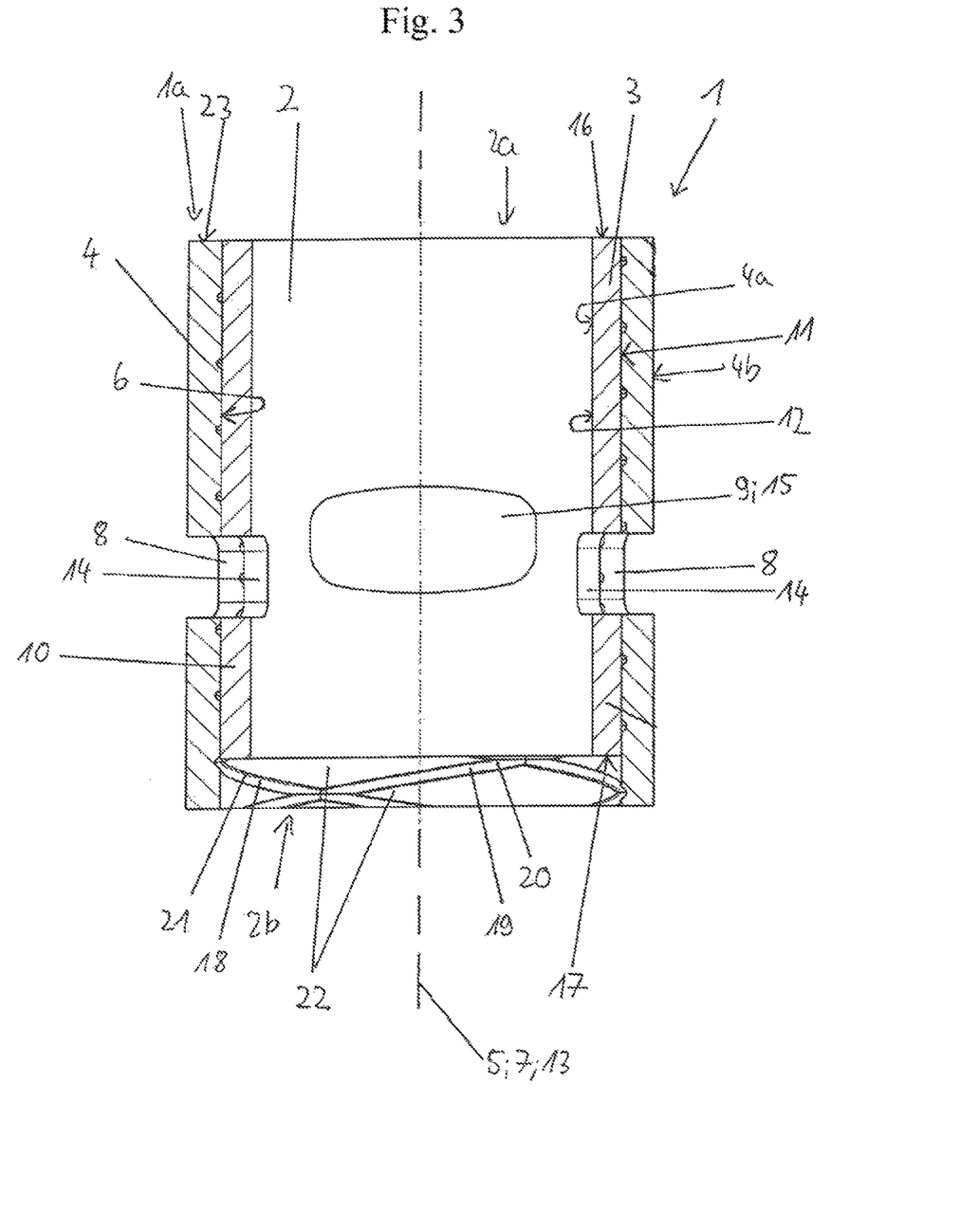

The different possibilities according to the invention for supporting the cylinder bushing 3 in the cylinder casing 1 will be described below:

According to a first embodiment of the invention, the cylinder bushing 3 is glued into the cylinder casing 1, in particular into the cylinder bore 2 (FIG. 3). To that end, the cylinder bore 2 has a right-hand internal thread, in other words an internal thread 18 that rises in the clockwise direction and a left-hand internal thread, in other words an internal thread 19 that rises in the counterclockwise direction. The threads 18; 19 each extend around the entire cylinder casing wall 4 or cylinder bore 2, viewed in the axial direction.

In particular, the threads 18; 19 are each a multistart thread, preferably a 3-start thread. It is also possible, however, for them to be a 1-start thread. The two threads 18; 19 each have respective thread turns 20; 21 and the thread turns 20; 21 of the two threads 18; 19 crisscross each other and intersect. As a result, the thread turns 20; 21 form individual mating surfaces 22 between themselves, which have a lozenge-shaped outline, viewed from the cylinder axis 5 in the radial direction. The thread turns 20; 21 thus divide the bore surface 6 into a plurality of mating surfaces 22. Viewed from the bore surface 6 or inner casing surface 4a, the thread turns 20; 21 are embodied in the form of indentations in the surface of the cylinder casing wall 4.

Figure 4:
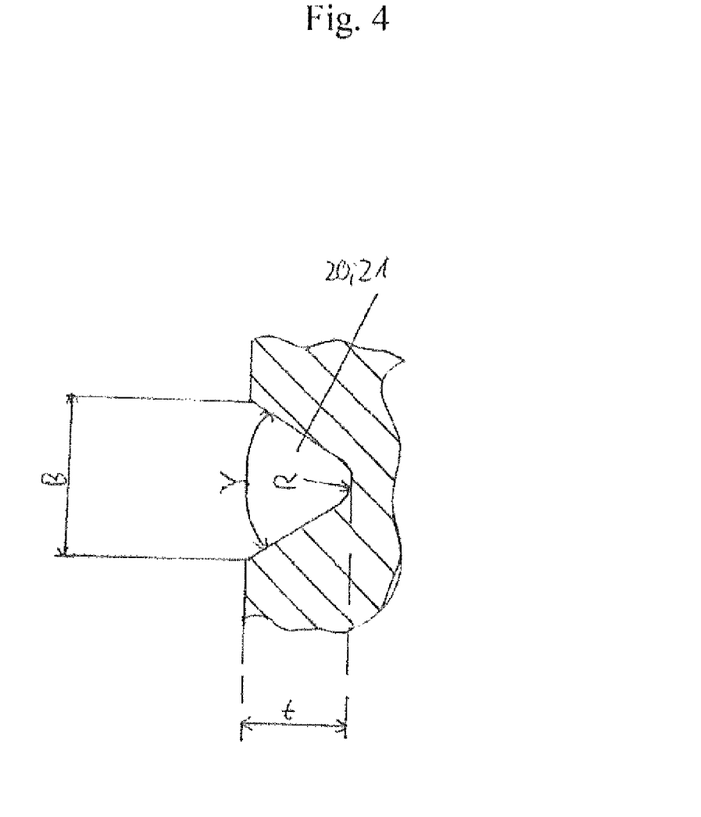
FIG. 4: is a schematic cross section through a thread turn in the cylinder casing according to FIG. 1, FIG. 5: is a very schematic longitudinal section through a cylinder casing of a cylinder according to another embodiment, with a cylinder bushing.

The two threads 18; 19 each have a respective pitch angle $\alpha$; $\beta$, where preferably, $\alpha$; $\beta$<90°. In addition, the threads 18; 19 can be round threads, buttress threads, sharp threads, or flat threads. In particular, they are sharp threads with a flank angle $\gamma$ of preferably 60° (FIG. 4).

In addition, the two threads 18; 19 are preferably embodied identically with regard to their geometry, e.g. the degree of their pitch, the depth t, the width B, the radius R of the base (FIG. 4), the number of turns, etc. They can, however, also be embodied differently from each other.

Furthermore, the diameter of the bore surface 6 suitably corresponds to the diameter of the outer bushing surface 11.

The cylinder bushing 3 according to the first embodiment of the invention is installed as follows:

First, a glue is applied to the bore surface 6 so that the entire bore surface 6 is covered with glue. In other words, all of the mating surfaces 22 are covered with glue and the thread turns 20; 21 are likewise filled with glue as completely as possible. For example, this is accomplished by means of a spatula. The glue is preferably a temperature-resistant glue that remains elastic at high temperatures. In particular, it is a two-component epoxy resin glue that in particular cures at room temperature.

When the cylinder bushing 3 is inserted into the cylinder bore 2 from the first cylinder end 1a, the cylinder bushing 3 slides with its outer bushing wall 11 along the bore surface 6, in particular along the mating surfaces 22 and is guided along them. As this occurs, the glue that is present on the bore surface 6, in particular on the mating surfaces 22, is stripped from the bore surface 6, in particular from the mating surfaces 22, and pushed in front of the cylinder bushing 3. In addition, the glue that protrudes from the thread turns 20; 21 into the interior of the cylinder casing 1 is stripped away, but the thread turns 20; 21 remain filled. Because of the pitch of the thread turns 20; 21, the stripping in this case occurs in a fashion similar to a "drawing cut." This ensures in a particularly effective way that when the cylinder bushing 3 is inserted, the glue is not pulled out from the thread turns 20; 21 by the glue being carried along by the cylinder bushing 3, but is instead pushed into the thread turns 20; 21. This produces a gluing between regions of the outer bushing surface 11 and the cylinder casing 1 in the vicinity of the thread turns 20; 21. In the vicinity of the mating surfaces 22, however, the outer bushing surface 11 is suitably not glued to the bore surface 6. In these regions, the outer bushing surface 11 rests against the bore surface 6, which ensures a precise positioning and centering of the cylinder bushing 3 in the cylinder bore 2.

The cylinder bushing 3 is slid in until the first bushing end surface 16 is flush with the first cylinder end surface 23.

The gluing of the cylinder bushing 3 has the advantage that the glue compensates for the different thermal expansion coefficients of the metallic material of the cylinder casing 1 and the ceramic material of the cylinder bushing 3. In other words, the glue performs a buffering function. This is because the elasticity of the glue and the glue connection on the one hand permits the two parts that are connected to each other to experience different expansion in the axial direction due to the thermal load during operation, without the connection loosening or stresses being produced in the parts. On the other hand, the elastically deformable glue bridges over the difference between the greater expansion of the cylinder casing 1 in the radial direction and that of the cylinder bushing 3.

Consequently, even at the usually high operating temperatures, the gluing ensures a reliable, long-lasting, axially unchanging, rotationally secured mounting of the cylinder bushing 3 in the cylinder casing 1. In addition, the mating surfaces 22 ensure a precise-fitting arrangement of the cylinder bushing 3 in the cylinder casing 1 and the glue-filled thread turns 20; 21 ensure a long-lasting glued connection. In lieu of the right-hand and left-hand thread 18; 19, it is also possible for other recesses that serve as glue pockets for accommodating the glue to be let into the cylinder wall 4 from the bore surface 6, preferably distributed over the entire cylinder wall 4 or bore surface 6. For example, a plurality of channels or grooves extending in the circumference direction can be provided, which are situated one above another in the axial direction. Preferably, however, the channels extend at an angle 90° relative to the cylinder axis 5 and are therefore inclined, i.e. at an acute angle, relative to the second bushing end surface 17 in order to ensure the above-described stripping of the glue in a fashion similar to a "drawing cut." In other words, the channels respectively extend like the thread turns 20; 21, not only in the circumference direction, but also simultaneously and proportionately in the axial direction as well. Their directional vectors thus each have a component in the axial direction of the cylinder casing 1 and a component in its circumference direction. Furthermore, the channels do not have to be continuous. Alternatively, for example, it is also possible to provide a plurality of longitudinal channels situated next to one another in the circumference direction. It is also possible to provide only one thread.

Figure 5:
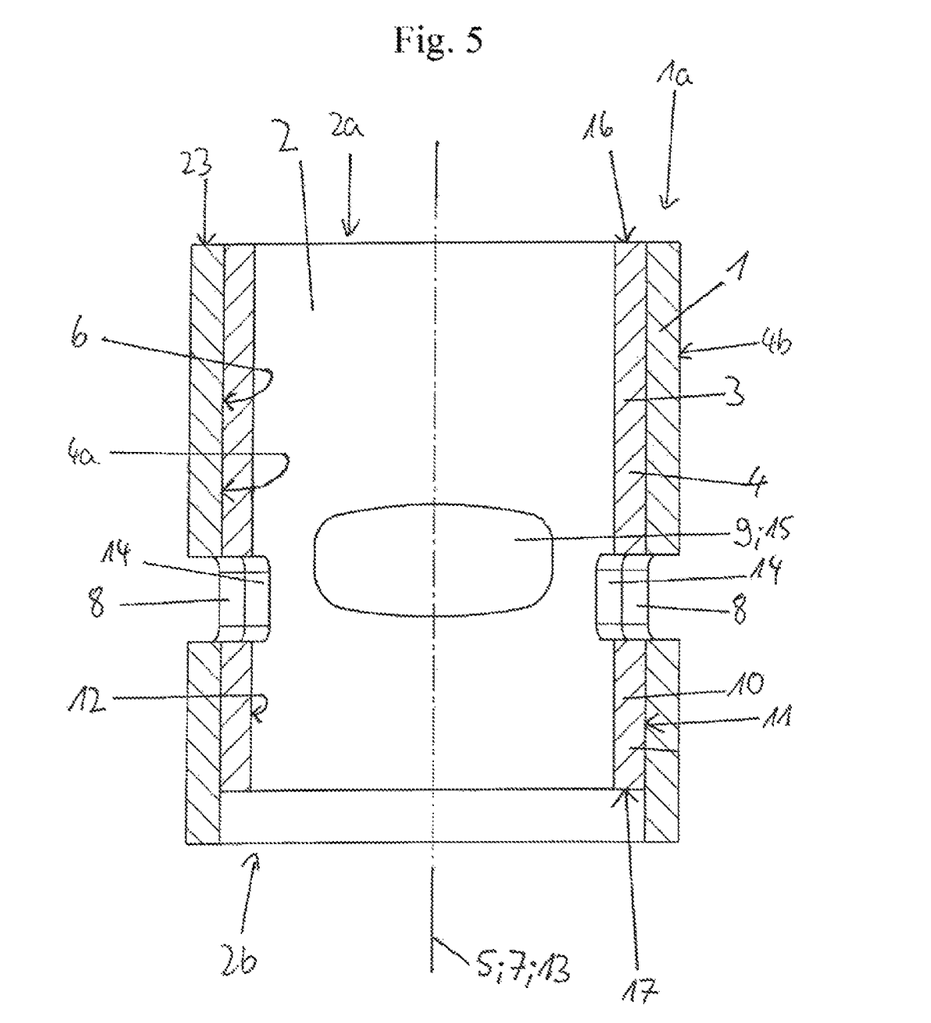
Figure 6:
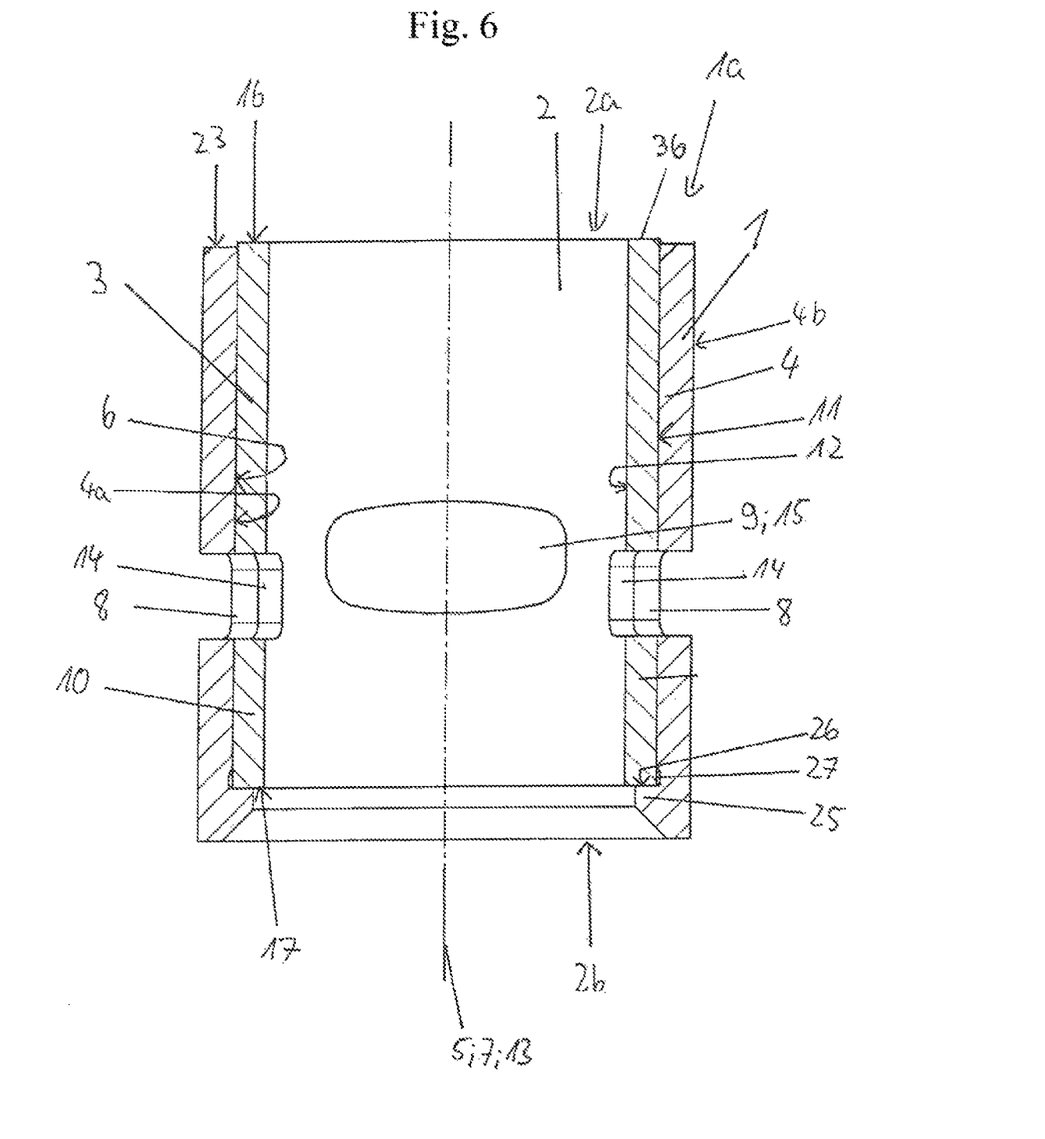
FIG. 6: is a very schematic longitudinal section through a cylinder casing of a cylinder according to another embodiment of the invention, with a cylinder bushing.
Figure 7:
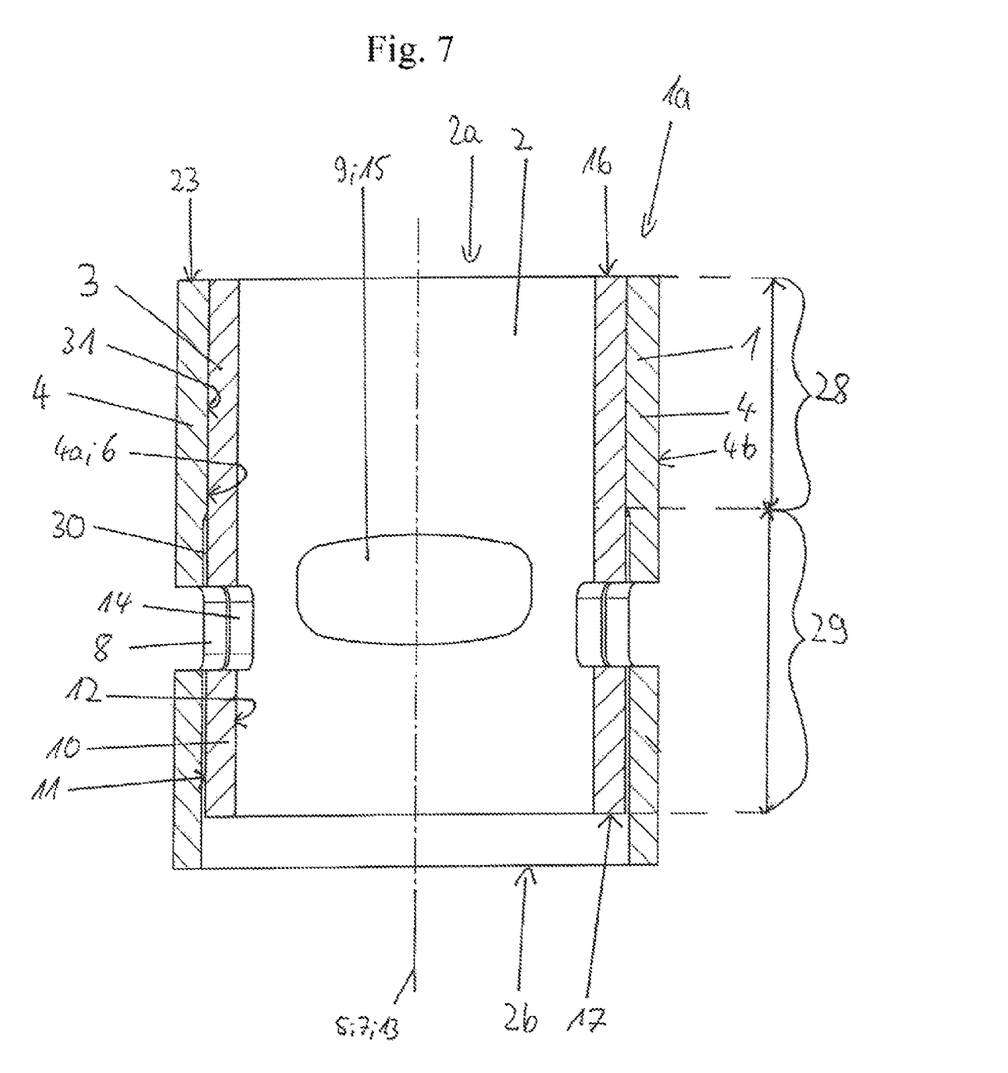
FIG. 7: is a very schematic longitudinal section through a cylinder casing of a cylinder according to another embodiment of the invention, with a cylinder bushing.
Figure 8:
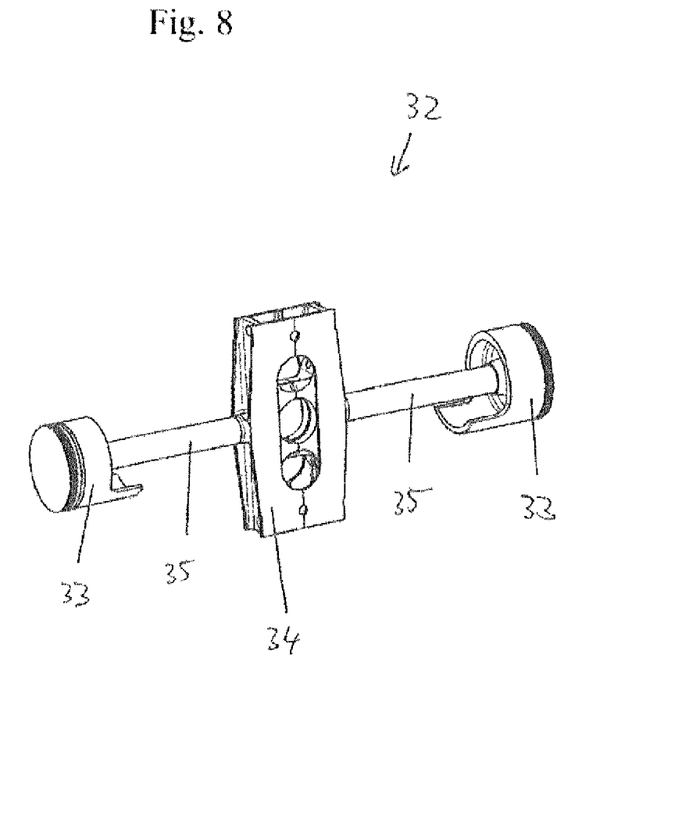
FIG. 8: is a simplified, perspective view of a part of a Scotch yoke mechanism.

According to another embodiment, the cylinder casing 1 is press-fitted onto the cylinder bushing 3 so that the cylinder bushing 3 is supported in the cylinder casing 1 with a press fit (FIGS. 5-7). The press-fitting in this case is carried out, for example, by heating the cylinder to approximately 200° C., inserting the room-temperature cylinder bushing 3 into the cylinder bore 2 from the first cylinder end 1a, and then cooling the cylinder. In this context, a press fit or interference fit means that the maximum size of the diameter of the bore surface 6 is in any case smaller than the minimum size of the diameter of the outer bushing surface 11. This press-fitting method is particularly suitable for a cylinder composed of grey cast iron since its thermal expansion coefficient is lower than that of, for example, aluminum and as a result, a detachment of the connection due to the different thermal expansion coefficients of the cylinder and cylinder bushing 3 is avoided even at higher temperatures.

In this case, the cylinder bushing 3 can, for example, be press-fitted over its entire axial length into the cylinder bore 2 (FIGS. 5 and 6). In other words, a press fit is produced with a single fitting dimension between the bore surface 6 and the outer bushing surface 11 over the entire length of the cylinder bushing 3 in the direction of the bushing axis 13.

According to one embodiment, the first bushing end surface 16 ends flush with the first cylinder end surface 23 and in the region of the second bushing end surface 17, the cylinder bushing 3 extends freely (FIG. 7) and is not supported or braced. In particular, the cylinder bore 2 extends in the axial direction beyond the cylinder bushing 3 in the region of the second bushing end surface 17.

According to another embodiment of the invention (FIG. 6), the cylinder casing 1 also has an annular support shoulder or support rim 25 that protrudes radially inward from the bore surface 6, i.e. toward the bore axis 7. In particular, the support shoulder 25 is molded onto the bore surface 6. The support shoulder 25 is situated at or adjacent to the second cylinder end 1b and second bore end 2b. In addition, the support shoulder 25 has an in particular planar support surface 26 that extends perpendicular to this cylinder axis 5 and the bore axis 7. The support surface 26 is oriented toward the first cylinder end 1a and first bore end 2a. In addition, the cylinder casing 1 preferably has a continuous relief groove 27 that is situated in the corner region where the support surface 26 and the bore surface 6 adjoin each other. In lieu of or in addition to the relief groove 27, a radius can be provided on the outer edge of the cylinder bushing 3 in the vicinity of the second bushing end surface 17.

In the embodiment with the support shoulder 25, the installation is carried out analogously to the installation without the support shoulder 25. However, the support shoulder 25 serves as an axial stop during assembly. In other words, the cylinder bushing 3 is inserted into the cylinder casing 1 until the second bushing end surface 17 comes into contact with and rests against the support surface 26. The relief groove 27 in this case ensures that the cylinder bushing 3 can be easily inserted, in particular without jamming, until it reaches the support shoulder 25 and the bushing end surface 17 comes to rest with its entire area against the support surface 26. In particular, the support shoulder 25 does not protrude as far into the cylinder bore 2 in a radial direction as the cylinder bushing 3.

In the assembled state of the reciprocating piston machine, the cylinder bushing 3 is then firmly clamped in the axial direction between the support shoulder 25, in particular the support surface 26, and the cylinder head, which is screw-mounted to the cylinder with the interposition of a cylinder head gasket. As a result, the cylinder bushing 3 is supported in the cylinder bore 2 in an axially immobile fashion. In addition to the press-fitting, this clamped connection secures the cylinder bushing 3 against rotating around the bushing axis 13. The elastically deformable cylinder head gasket compensates for the different expansion coefficients of the metallic cylinder casing 1 and the ceramic cylinder bushing 3.

In this embodiment, the lengths of the cylinder bushing 3 and the bore surface 6 except for the support shoulder 25 are preferably dimensioned and matched to each other in the axial direction so that the first bushing end surface 16 of the cylinder bushing 3 protrudes slightly beyond the cylinder casing 1, i.e. beyond the cylinder end wall 23 oriented toward the cylinder head. This overhang 36 improves the clamping of the cylinder bushing 3.

As an alternative to the molded-on support shoulder 25, it is naturally also possible, for example, to use a snap ring or securing ring (not shown) as the support shoulder, with the securing ring being situated in an internal, continuous groove in the cylinder casing wall 4. The securing ring likewise protrudes into the interior of the cylinder casing 1 and forms a support surface for the second bushing end surface 17.

According to another embodiment of the invention, the cylinder bushing 3 is only press-fitted into the cylinder bore 2 over part of its length (FIG. 7). In other words, a press fit with a single fitting dimension between the bore surface 6 and the outer bushing surface 11 is provided over only part of the overall length of the cylinder bushing 3. In addition, the cylinder casing 1 or cylinder casing wall 4 is press-fitted onto the cylinder bushing 3 over only part of the overall length of the cylinder bushing 3.

In particular, the press fit between the outer bushing surface 11 and the bore surface 6 is produced in a press-fitting region or outer bushing surface fitting region 28 that extends from the first bushing end surface 16 oriented toward the cylinder head and the first bushing outlet opening 15 in the axial direction viewed from the first bushing end surface 16 oriented toward the cylinder head. In particular, the outer bushing surface fitting region 28 extends from the cylinder end surface 23 oriented toward the cylinder head to the first bushing outlet opening 9 or 15, viewed in the axial direction from the first bushing end surface 16. In other words, depending on whether an overhang 36 is provided, the outer bushing surface fitting region 28 starts at the cylinder end surface 23 oriented toward the cylinder head or at the first bushing end surface 16 and ends preferably spaced apart from the first bushing outlet opening 15, viewed in the axial direction from the first bushing end surface 16.

In a non-press-fitted outer bushing surface region 29 of the cylinder bushing 3 that adjoins the outer bushing surface fitting region 28 of the cylinder bushing 3 in the axial direction, the outer bushing surface 11 is spaced apart from the bore surface 6. There is an annular gap between the outer bushing surface 11 and the bore surface 6. The non-press-fitted outer bushing surface region 29 extends in the axial direction from the outer bushing surface fitting region 28, past the inlet, overflow, and outlet openings 14; 15, to the second bushing end surface 17. As a result, the cylinder bushing 3 is not clamped or press-fitted in the cylinder bore 2 in the region of the inlet, overflow, and outlet openings 14; 15 so that no stresses act on the cylinder bushing 3 in this region. In particular, the cylinder bushing 3 in the free region 29 can warp, i.e. expand and contract, without hindrance, i.e. independently of the cylinder casing 1, in the radial and axial direction in response to the thermal load.

This arrangement is achieved, for example, in that the diameter of the outer bushing surface 11 is constant over the entire length of the cylinder bushing 3. The cylinder bore 2 or the bore surface 6 first has a mating surface 31, viewed in the axial direction from the first cylinder end surface 23 and first cylinder end 1a, i.e. in the outer bushing surface fitting region 28. The diameter of a mating surface 31 corresponds to the diameter of the outer bushing surface 11, with the predetermined undersizing required for the press fit. As a result, the cylinder bushing 3 is press-fitted into the cylinder bore 2 in the region of the mating surface 31. The mating surface 31 comes to an end at the above-described distance from the first bushing outlet opening 15. Adjacent to the mating surface 31, the cylinder bore 2 expands to form the annular gap 30. The diameter of the bore surface 6 after the mating surface 31 is therefore greater than the diameter of the outer bushing surface 11.

Alternatively to this, the diameter of the bore surface 6 can be constant and the diameter of the outer bushing surface 11 can decrease to form the annular gap 30 (not shown). In another alternative, both an increase in the diameter of the bore surface 6 and a decrease in the diameter of the outer bushing surface 11 are provided after the press-fitting region 28.

In addition, the press fit can instead or additionally extend between the second bushing end surface 17 and the first gas passage 14; 15 of the cylinder bushing 3, viewed in the axial direction from the second bushing end surface 17 so long as none of the gas passages 14; 15 of the cylinder bushing 3 is embodied in the form of a slot.

According to the invention, it is only necessary to ensure that the non-press-fitted outer bushing surface region 29, viewed in the axial direction from the bushing end surface 16 oriented toward the cylinder head, extends from the beginning of the first gas passage of the cylinder bushing 3, which is usually a bushing outlet opening 15, to the end of the last gas passage of the cylinder bushing 3, which is usually a bushing inlet opening.

According to another embodiment of the invention (not shown), the cylinder bushing is composed of ceramic with a particular thermal conductivity, preferably SiC, in particular Si-metal-infiltrated SiC, and is situated in a ceramic support bushing that is composed of insulating ceramic, i.e. a ceramic material whose thermal conductivity is less than that of the material of which the cylinder bushing is composed. For example, the cylinder bushing is composed of $Al_2O_3$. For installation, the cylinder bushing is inserted into the support bushing and then the support bushing is cast into the metallic cylinder in an intrinsically known way, with the two solid bushings being surrounded by a liquid metal that is cast into the mold and subsequently cooled to create the "cast in" arrangement. When the cylinder cools, it contracts so that the support bushing is compressed and as a result, the cylinder bushing is clamped into and press-fitted in the support bushing. An arrangement of this kind ensures that the temperatures that occur during combustion stay inside the cylinder because the cylinder bushing is surrounded by insulating ceramic. This can be advantageous with certain kinds of fuel.

The embodiments according to the invention described above all permit a rotationally fixed, axially immobile support of a ceramic cylinder bushing in a metallic cylinder casing or a cylinder casing composed of plastic. In addition, the inner bushing surfaces 12 of the cylinder bushings 3 are preferably ground to size after having been inserted into the cylinder casing 1 since the cylinder bushings 3 can be deformed during installation.

The embodiments according to the invention are naturally not limited to reciprocating piston internal combustion engines or motors, but can also be used in reciprocating piston compressors or reciprocating piston pumps. In addition, the embodiments are not limited to 2-stroke engines, but can also be used in 4-stroke engines, in this case without providing inlet, overflow, and outlet openings in the cylinder bushing and cylinder casing.

It is particularly advantageous, however, for the above-described embodiment according to the invention to be used in machines with a Scotch yoke mechanism, in particular engines equipped with a Scotch yoke mechanism, because in these machines, no tilting forces are exerted on the cylinder bushings.

The scope of the invention naturally also includes providing the support shoulder 25 or securing ring in the embodiments with the glue-mounted cylinder bushing 3, with the only partially press-fitted cylinder bushing 3, and with the cylinder bushing supported in the support bushing. Also in these embodiments, the cylinder bushing 3 can be dimensioned so that it protrudes in the axial direction beyond the cylinder wall 4, in particular beyond the cylinder end surface 23, in order to ensure axial clamping. Furthermore, the recesses provided for accommodating the glue—in particular the threads 20; 21—can also extend only over a region corresponding to the mating region 28 so that a gluing occurs only in this region.

The invention claimed is:

1. A cylinder composed of a metallic material or plastic for use in a reciprocating piston machine having a crank mechanism, the cylinder comprising:
    at least one cylinder casing having a cylinder casing wall and a cylinder bore with a bore surface,
    a cylinder bushing composed of ceramic material supported in the cylinder bore, wherein the cylinder bushing is glued into the cylinder bore with glue; and
    at least one glue pocket in the bore surface that is filled with the glue, wherein the at least one glue pocket is in the form of a right-hand internal thread and a left-hand internal thread and the threads each extend over the entire cylinder bore, viewed in the axial direction.

2. The cylinder as recited in claim 1, wherein the two threads each have one or more thread turns and the thread turns of the two threads crisscross each other and intersect.

3. The cylinder as recited in claim 2, wherein the crisscrossing thread turns divide the bore surface into individual mating surfaces against which an outer bushing surface of the cylinder bushing rests.

4. A cylinder composed of metallic material or plastic for use in a reciprocating piston machine functioning in accordance with a 2-stroke principle, the piston machine having a crank mechanism, the cylinder comprising:
    at least one cylinder casing that has a cylinder bore, and
    a cylinder bushing composed of ceramic material supported in the cylinder bore, the cylinder bushing having a bushing axis and a bushing end surface oriented toward a cylinder head;
    wherein the cylinder casing has at least two gas passages including at least one cylinder inlet opening and at least one cylinder outlet opening, and the cylinder bushing has at least two gas openings including at least one bushing inlet opening and at least one bushing outlet opening; and
    a press fit is provided between a bore surface of the cylinder bore and an outer bushing surface of the cylinder bushing in an outer bushing surface fitting region, which, viewed along an axial direction from the bushing end surface oriented toward the cylinder head, extends between the bushing end surface oriented toward the cylinder head and a first of the at least two gas openings of the cylinder bushing, and wherein in a non-press-fitted outer bushing surface region, an annular gap is provided between the outer bushing surface and the bore surface.

5. The cylinder as recited in claim 4, wherein, axially opposite from the bushing end surface oriented toward the cylinder head, the cylinder bushing comprises a bushing end surface oriented toward the crank mechanism, and the cylinder casing has an annular support shoulder, which protrudes radially inward from the bore surface and against which the bushing end surface of the cylinder bushing oriented toward the crank mechanism is supported.

6. The cylinder as recited in claim 5, wherein the support shoulder is formed onto the bore surface.

7. The cylinder as recited in claim 4, wherein ends of the outer bushing surface fitting region are spaced apart from the first of the at least two gas openings, as viewed along the axial direction from the first bushing end surface.

8. A reciprocating piston machine having a crank mechanism, comprising the cylinder as recited in claim 4.

* * * * *